(12) United States Patent
Sanders

(10) Patent No.: US 12,106,346 B2
(45) Date of Patent: Oct. 1, 2024

(54) CUSTOMIZED FOOD AND RECIPE ORDERING, PRODUCTION, LABELING, AND DELIVERY SYSTEM AND METHOD OF USE

(71) Applicant: Christine M. Sanders, Kansas City, MO (US)

(72) Inventor: Christine M. Sanders, Kansas City, MO (US)

( * ) Notice: Subject to any disclaimer, the term of this patent is extended or adjusted under 35 U.S.C. 154(b) by 86 days.

(21) Appl. No.: 17/884,848

(22) Filed: Aug. 10, 2022

(65) Prior Publication Data

US 2022/0383378 A1 Dec. 1, 2022

Related U.S. Application Data

(63) Continuation of application No. 16/857,841, filed on Apr. 24, 2020, now abandoned, which is a
(Continued)

(51) Int. Cl.
*G06Q 30/0601* (2023.01)
*G06Q 10/0832* (2023.01)
(Continued)

(52) U.S. Cl.
CPC ..... *G06Q 30/0621* (2013.01); *G06Q 10/0832* (2013.01); *G06Q 10/0835* (2013.01); *G06Q 20/18* (2013.01); *G06Q 30/0279* (2013.01); *G06Q 30/0637* (2013.01); *G06Q 50/12* (2013.01); *G07C 9/33* (2020.01); *G09B 5/065* (2013.01); *G09B 19/003* (2013.01)

(58) Field of Classification Search
CPC .......... G06Q 30/0621; G06Q 10/0836; G06Q 30/06; G06Q 50/12; G06Q 30/0635; G06Q 30/0641
See application file for complete search history.

(56) References Cited

U.S. PATENT DOCUMENTS 11,176,770 B2 * 11/2021 Ambauen .............. G06Q 20/18
2003/0141214 A1 7/2003 MacGuire
(Continued)

OTHER PUBLICATIONS

Hannah Mars, "Two Good to be true", Feb. 22, 2016, broadsheet (Year: 2016).*
(Continued)

*Primary Examiner* — Florian M Zeender
*Assistant Examiner* — Vanessa Deligi
(74) *Attorney, Agent, or Firm* — Law Office of Mark Brown, LLC; Christopher M. DeBacker

(57) ABSTRACT

An interactive and customizable food delivery system with a high degree of personalization. The system provides for the personalization of a product and product label thereby delivering a client-specified food product based upon their recipe input through a computer device interface. Through use of a computer interface, such as a mobile computing device or "smart phone," personal computer, or even through a unique computerized kiosk located at a fixed location, the user can input recipes or order products from existing recipes. The product is prepared either locally or remotely and is then delivered or shipped to the user with a customized label indicating ingredients and other information.

4 Claims, 8 Drawing Sheets

Related U.S. Application Data continuation-in-part of application No. 15/453,533, filed on Mar. 8, 2017, now abandoned.

(60) Provisional application No. 62/305,897, filed on Mar. 9, 2016.

(51) Int. Cl.

| | | |
|---|---|---|
| *G06Q 10/0835* | (2023.01) | |
| *G06Q 20/18* | (2012.01) | |
| *G06Q 30/0279* | (2023.01) | |
| *G06Q 50/12* | (2012.01) | |
| *G07C 9/33* | (2020.01) | |
| *G09B 5/06* | (2006.01) | |
| *G09B 19/00* | (2006.01) | |

(56) References Cited

U.S. PATENT DOCUMENTS

| | | |
|---|---|---|
| 2007/0150375 A1 | 6/2007 | Yang |
| 2007/0294129 A1* | 12/2007 | Froseth ............... G06Q 10/101 705/26.1 |
| 2009/0071972 A1 | 3/2009 | Peyran et al. |
| 2009/0150241 A1* | 6/2009 | Laboise ............... G06Q 50/12 705/26.1 |
| 2009/0157752 A1* | 6/2009 | Gonzalez ............. G06Q 30/06 |
| 2012/0262271 A1 | 10/2012 | Torgersrud et al. |
| 2013/0191251 A1 | 7/2013 | Martin et al. |
| 2013/0317921 A1 | 11/2013 | Havas |
| 2014/0101233 A1 | 4/2014 | Mina |
| 2014/0324607 A1 | 10/2014 | Frehn et al. |
| 2014/0330603 A1 | 11/2014 | Corder et al. |
| 2015/0088694 A1* | 3/2015 | Ackerman ......... G06Q 30/0641 705/28 |
| 2015/0145642 A1 | 5/2015 | Rutledge et al. |
| 2015/0235193 A1 | 8/2015 | Cummings |
| 2016/0170939 A1 | 6/2016 | Chen et al. |
| 2017/0256119 A1* | 9/2017 | Abdelmalak .......... G06Q 20/18 |

OTHER PUBLICATIONS

The Solo Cook, "Swap fresh food from garden with neighbors and friends", https://thesolocook.com/2012/06/25/garden-share-food-strawberries-neighbors/, Jun. 25, 2012, 1-4.

* cited by examiner

CUSTOMIZED FOOD AND RECIPE ORDERING, PRODUCTION, LABELING, AND DELIVERY SYSTEM AND METHOD OF USE

CROSS REFERENCE TO RELATED APPLICATION

This application is a continuation of and claims priority in U.S. patent application Ser. No. 16/857,841 filed Apr. 24, 2020, which is a continuation-in-part of and claims priority in U.S. patent application Ser. No. 15/453,533, filed Mar. 8, 2017, which claims priority in U.S. Provisional Patent Application No. 62/305,897, filed Mar. 9, 2016, which is incorporated herein by reference.

BACKGROUND OF THE INVENTION

1. Field of the Invention

The present invention relates generally to a food processing and delivery system and method for use thereof, and more specifically to a self-contained, customizable and personalized food delivery system and method of use thereof.

2. Description of the Related Art

Most households in America are faced with the continuous challenge of teaching their kids to make good decisions about food choice. This active conversation between parents and children can often lead to arguments and ultimately feelings of discord which can become part of a very negative dialogue for most families. As a result, there is not only valuable time lost for families associated with this tension, but also a true financial cost due to food waste and non-nutritious food intake. Beyond the emotional issues associated with healthy food choices, families are also facing rising expenses associated with food.

This problem or challenge most certainly exists globally, ultimately presenting an opportunity for an international revenue model, but the early scope of the business concept is to remain focused on the approximately 40 million households which participate in the production and/or consumption of garden-raised, home-canned goods.

What is needed is a system providing easily customizable and personalized food options which can be entirely produced, labeled, and delivered at a single point. Food items can be produced by qualified households, food manufacturers or other qualified market participants.

Heretofore there has not been available a system or method for a customizable food and recipe delivery system with the advantages and features of the present invention.

BRIEF SUMMARY OF THE INVENTION

The present invention generally provides an interactive and customizable food delivery system with a high degree of personalization. The system provides for the personalization of a product and product label thereby delivering a client-specified food product based upon their recipe input through a computer device interface. Through use of a computer interface, such as a mobile computing device or "smart phone," personal computer, or even through a unique computerized kiosk located at a fixed location, the user can input recipes or order products from existing recipes. The product is prepared either locally or remotely and is then delivered or shipped to the user with a customized label indicating ingredients and other information.

Benefits of the present invention include, but are not limited to: (1) customized recipe generation resulting from an interaction system; (2) personalized, home-preserved goods which can be labeled; (3) facilitation of produce and home-preserved goods exchanged in an exclusive web environment with a variety of qualified market participants—expert households, food manufacturers, community gardens, community kitchens, buying institutions; and (4) educational processes and information for food preservation.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, or other handheld computing devices. The computing device could be included in a stand-alone kiosk which is electrically communicating with a local or remote system for producing, exchanging or gifting and in some instances selling customized and/or personalized garden and preserved food goods or other final products.

II. Preferred Embodiment Product Delivery System 2

Figure 1:
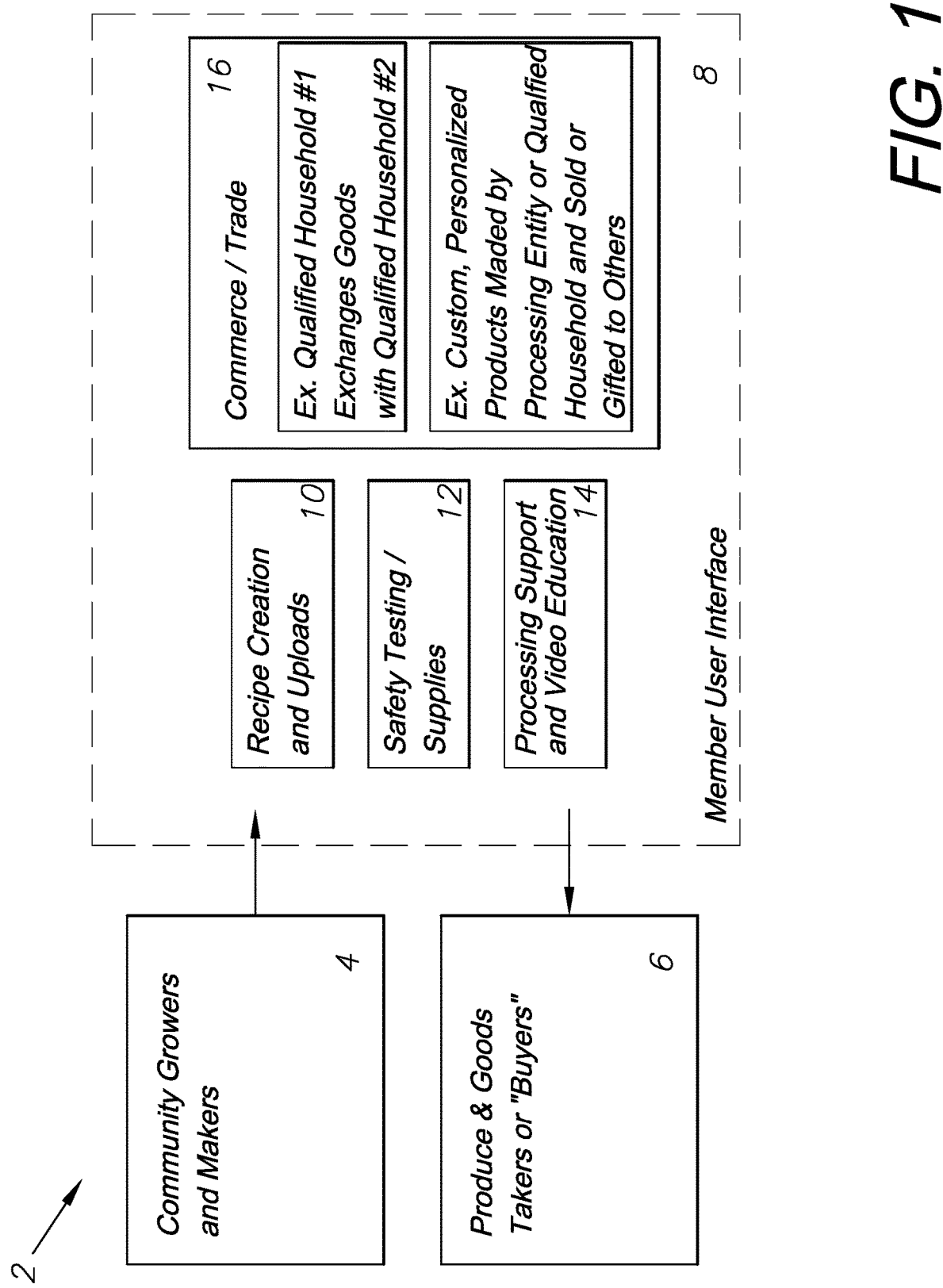
FIG. 1 is a diagrammatic representation showing the relationship between several elements of the present invention.

FIG. 1 shows a diagrammatic representation of several elements interacting within a product delivery system 2, which provides food or other consumer goods through a private network 26 to members within the network. As shown in FIG. 1, there is a member user interface 8 which is interacted with by the members of the product delivery system 2. Members may be made up of community growers and makers 4, which also may be referred to herein as "qualified households," and of produce and goods takers or "buyers" 6. The qualified households 4 make goods, and the buyers 6 request the goods. However, there are a number of other exchanges of goods and services capable of being performed with this system.

As shown, the member user interface 8 includes recipe creation features 10 and uploads of recipes created by members, safety testing and supply 12 which can be provided by a central entity, third parties, or other members, and processing support and video education 14 which also would be handled by a central entity or third party. These features provide a typical buyer/seller relationship with quality control on the back end. Other features of the present invention include commerce/trade features 16, such as the examples shown in the box therein. Two members can exchange goods directly using the system, or can create products for mere buyer-members. The member user interface 8 likely is a computer interface, such as a touch screen smart kiosk, mobile computing device (e.g. smartphone, tablet computer) or a personal computer.

Figure 2:
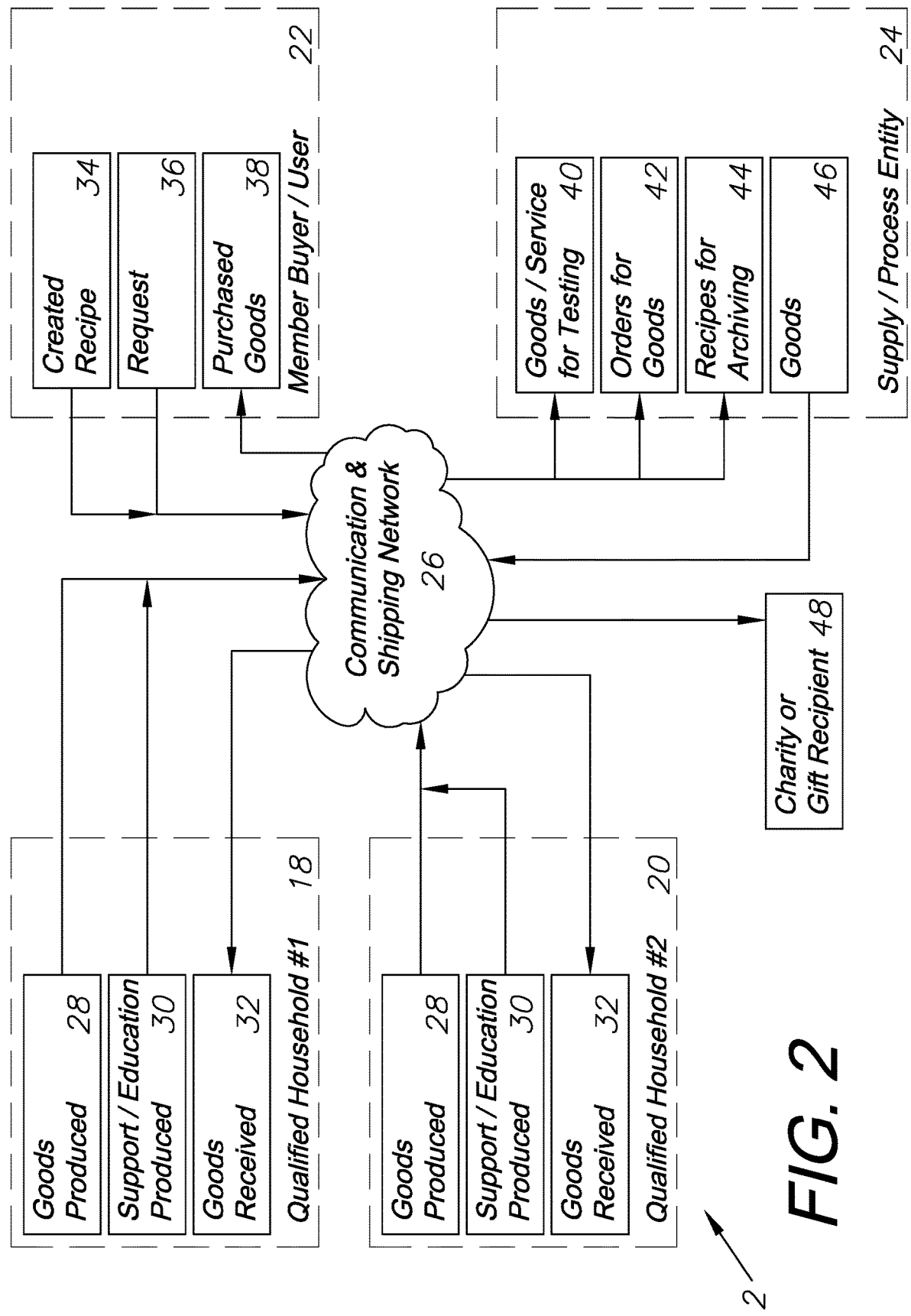
FIG. 2 is another diagrammatic representation showing the relationship between elements of the present invention.

FIG. 2 diagrams the relationships between multiple parties through a communications and shipping network 26 which is the core of the product delivery system 2. Shown here are a qualified household #1 18, a qualified household #2 20, a member buyer/user 22, a supply/process entity 24, and a charity or gift recipient 48. Of course, more qualified households and members could be included. The qualified households 18, 20 are approved by a central entity, such as the supply/process entity 24, to make and ship goods, such as food items, using the communication and shipping network 26. Member buyer/users 22 have limited access to the network 26. The supply/process entity 24 mostly controls the network and approves and monitors goods and transactions, but may also fulfill orders. The charity or gift recipient 48 is an outside entity which may receive goods based upon a transaction within the network.

Each of the qualified households 18, 20 have both inputs into the network 26 and outputs coming out of the network as shown in FIG. 2. Each qualified household may produce goods 28, which may be traded with other qualified households or member buyers 22. These goods could include food items or other homemade goods, or may consist of new food items from a recipe submitted by a member buyer/user 22. The qualified households can also provide support/education productions 30, such as educational videos for preparing a food or other product (e.g. how to pickle foods). These can also be ordered out by other users. Finally, since the qualified households are also members, they can receive goods 32 through the network 26 either by purchasing or trading with other qualified households.

The member buyer/user 22, which would likely be the most common user for the system, can create recipes 34 which can be submitted to the network 26 and be fulfilled either by the supply/process entity 24 or any of the qualified households 18, 20. These recipes may then also be stored in an archive 44 with the supply/process entity for access by other members. The member can also request 36 goods, such as those advertised by the qualified households. Purchased goods 38 are then shipped directly to the member 22.

The supply/process entity 24 may also act as a central entity which owns and operates the entire delivery system 2. This entity receives goods and productions for testing 40 from qualified households and approves them or rejects them, receives orders for goods 42 from members, and receives the members' recipes for archiving 44. The supply/process entity may also supply goods 46 out to members, or may source this from third parties.

Members have an option to send a charity a copy of whatever they order through the network 26, or to send a gift to another person who may or may not be a member. These charity or gift recipients 48 receive the goods purchased by members or sent for free by a qualified household through the communication and shipping network 26. Goods shipped through the network 26 could be sent directly to the buyer or recipient in the mail or other door-to-door delivery method, or could be sent to a localized kiosk or delivery point for pickup by the recipient or buyer.

Figure 3:
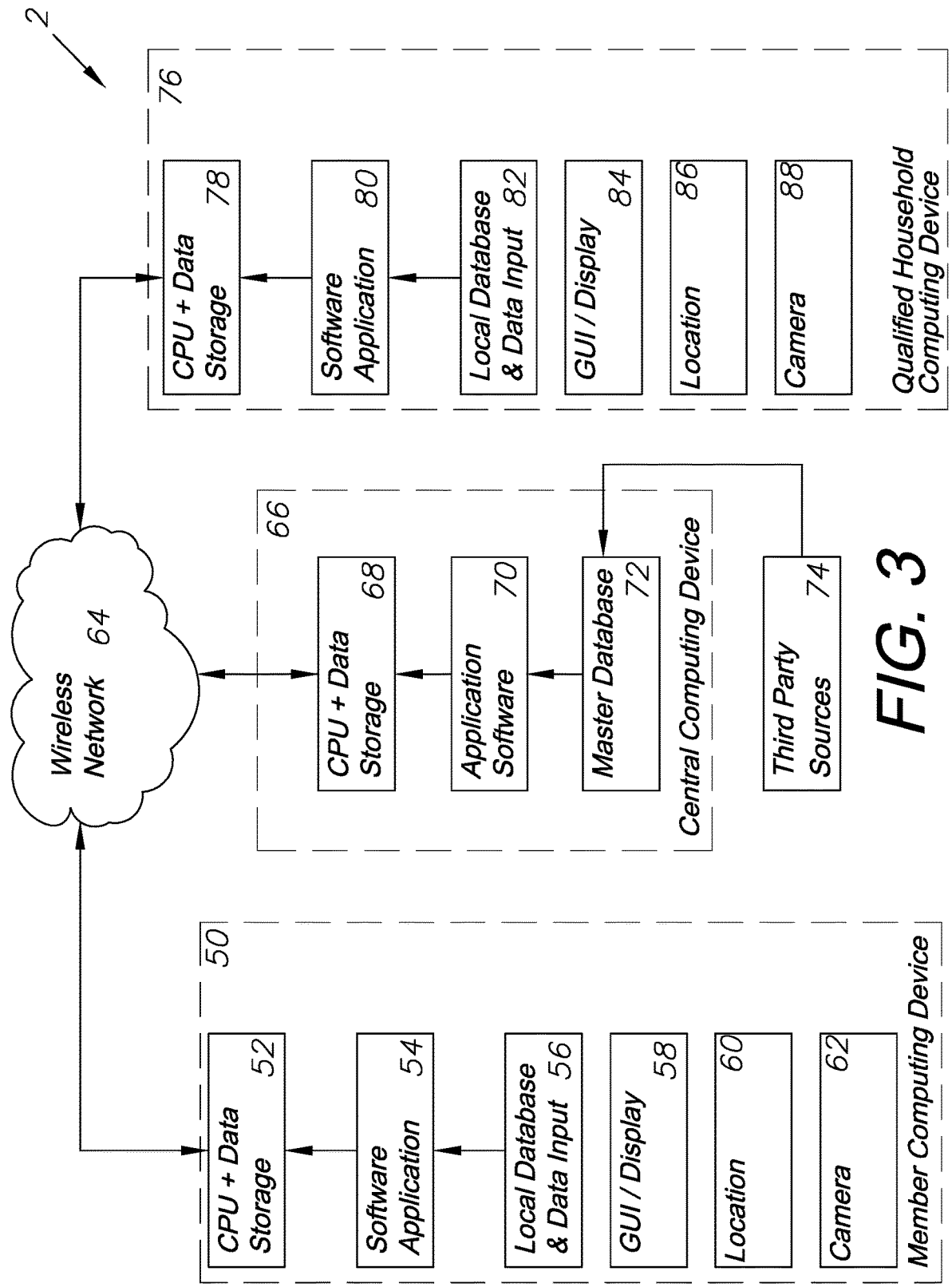
FIG. 3 is yet another diagrammatic representation showing the relationship between elements of the present invention.

FIG. 3 shows another relationship between the members and the network. Here, each of the parties communicates through a wireless network 64 by using computing devices, which may include personal computers, mobile computing devices (e.g. smart phones), or proprietary smart kiosks. Here, the member computing device 50 includes CPU and Data storage 52, a software application 54 for accessing the product delivery system 2, and a local data base with data input 56 for creating customized recipes and orders. The device 50 should also include a graphical user interface (GUI) 58, a location determination feature 60, such as a GNSS like GPS, and a camera 62 for taking and uploading photographs of recipes or products.

Similarly, the qualified household computing device 76 includes CPU and Data storage 78, a software application 80 for accessing the product delivery system 2, and a local data base with data input 82 for creating customized recipes and orders. The device 76 should also include a graphical user interface (GUI) 84, a location determination feature 86, such as a GNSS like GPS, and a camera 88 for taking and uploading photographs of recipes or products.

The central computing device 66, which is a central server most likely associated with the supply/process entity 24, but could be a separate entity, houses the central point of the product delivery system 2. There is a CPU and data storage 68, application software 70 necessary to arrange the features of the system as described above, and a master database 72 which includes records of all purchases, recipes, educational videos, and other data uploaded to the central computing device 66. Third party sources 74 may also add data to the master database. These third parties may include product sources used by the supply/process entity to fulfill orders.

Figure 3A:
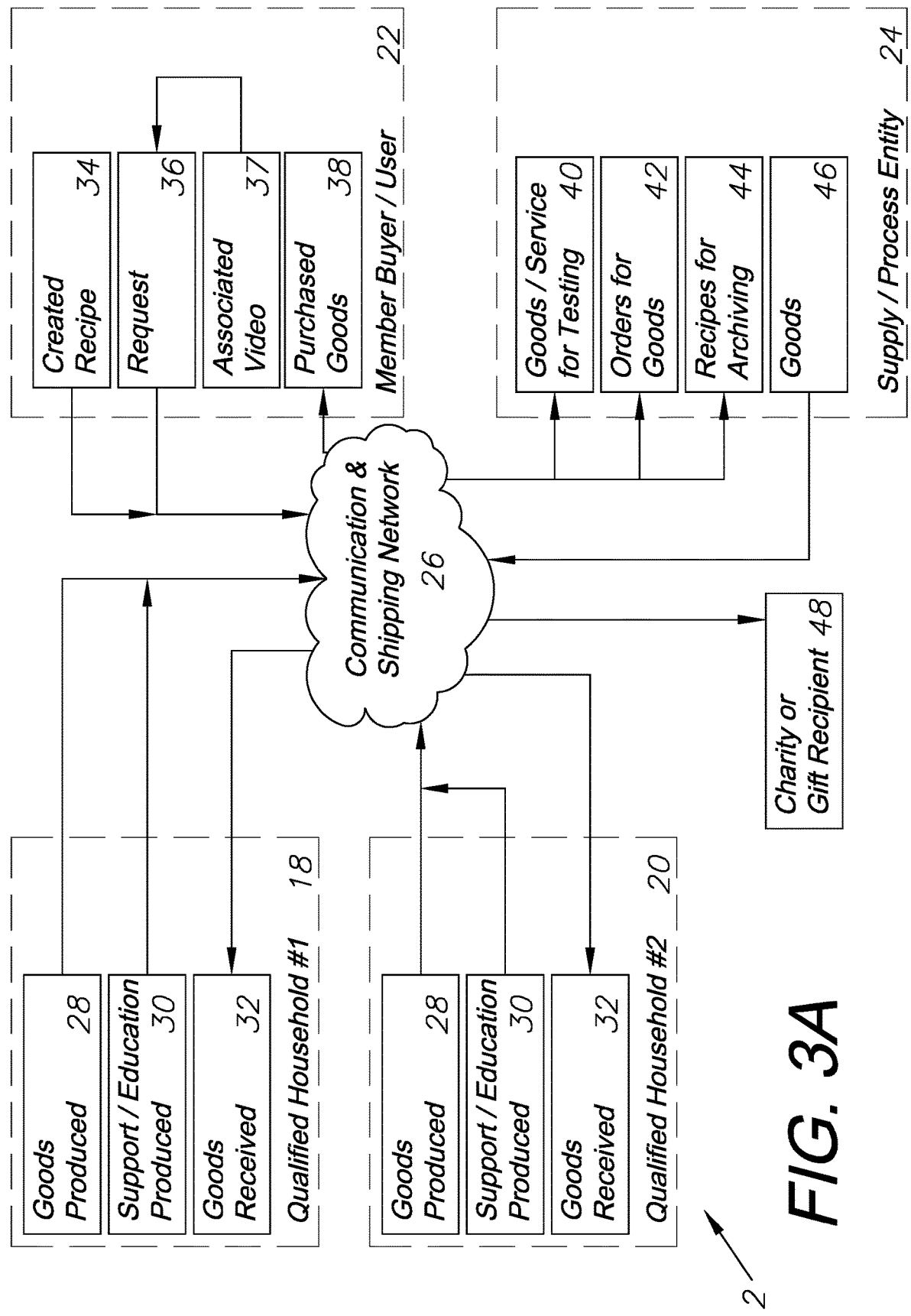
FIG. 3A is a slightly alternative diagrammatic representation thereof.

FIG. 3A shows a slightly modified system 2 wherein the member buyer/user 22 utilizes their camera 62 of their mobile computing device 50 to record a video which is delivered to the third party qualified households 18, 20 and/or the supply/process entity 24. This video could be an instructional video demonstrating how the food item is to be prepared or some other special details involving the request 36. This would allow for the member buyer/user 22 to provide homemade family recipes in greater detail to the third parties who prepare the goods and ensure that the quality and attention to detail is on par with the original.

Figure 4:
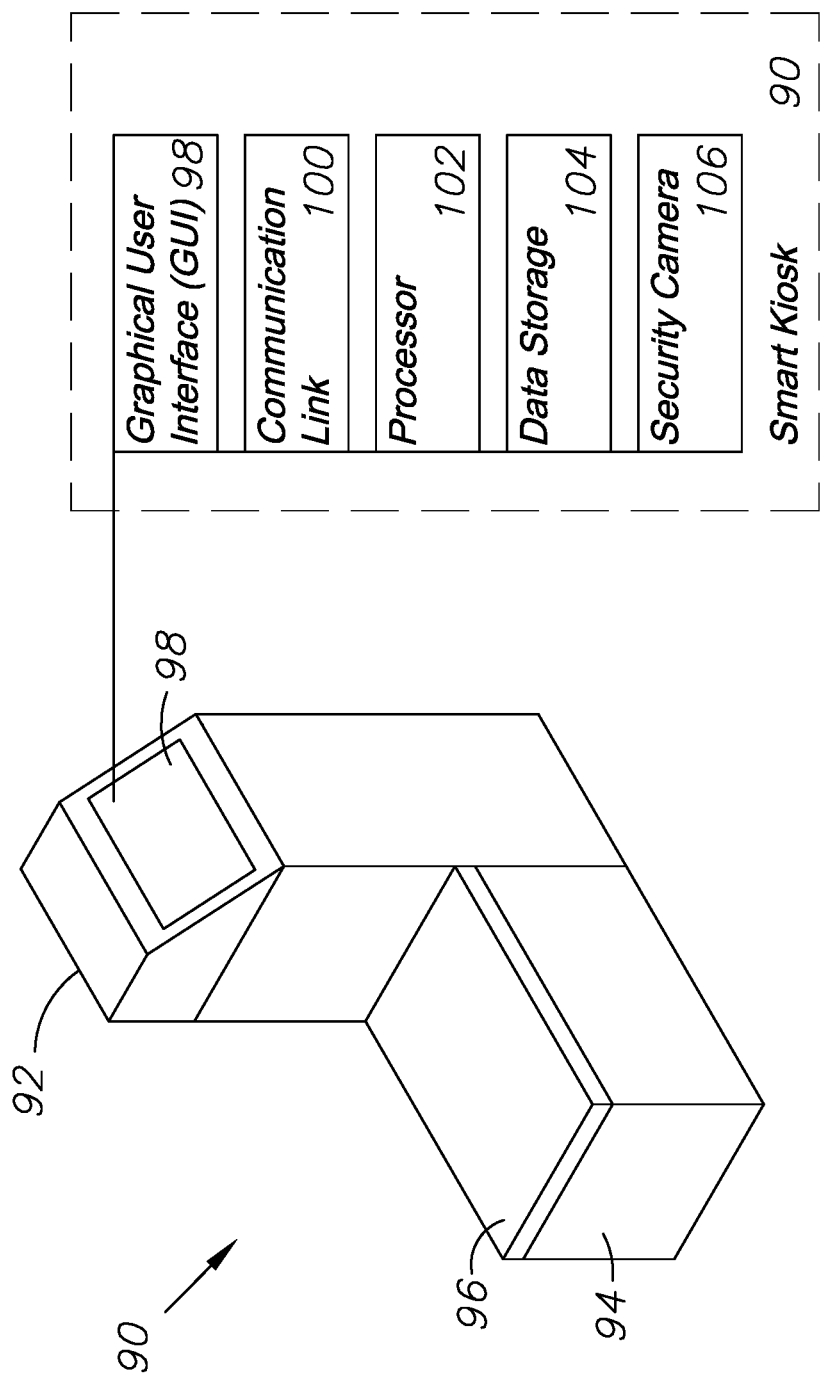
FIG. 4 is a diagrammatic representation of an interactive kiosk element of an embodiment of the present invention.

In lieu of every member having a mobile computing device or personal computer to access the network, smart kiosks 90, such as shown in FIG. 4, may be placed in geographically selected positions, such as near farmers markets or co-op stores. These kiosks would include a kiosk portion 92 which has a graphical user interface 98, communication link 100 (e.g. Wi-Fi or wired internet connection), processor 102, data storage 104, and optionally a security camera 106 to correctly identify members using the kiosk. The kiosk 90 may also include a secure drop-box portion 94 with an optional security lid 96 which requires passwords or identification to open. Here, users can drop off packages to be picked up by other members or postal service employees for shipment to buyers and other members.

Figure 5:
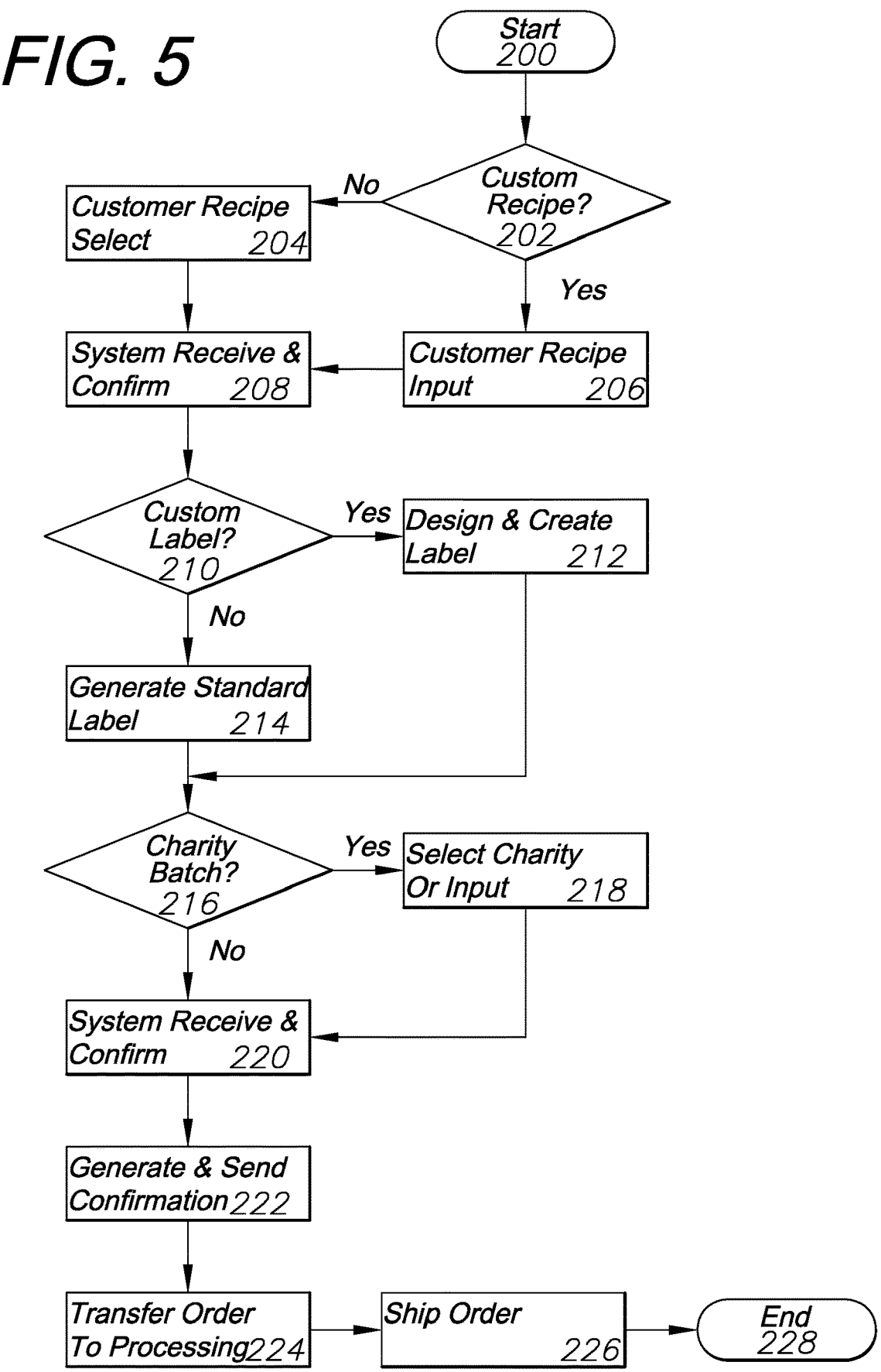
FIG. 5 is a flowchart diagramming steps taken in practicing an embodiment of the present invention.

FIG. 5 shows a typical method of practicing the present invention, which starts at 200. A buyer or member will need to decide at 202 whether they will be ordering a custom recipe or an existing recipe. If a custom recipe is selected at 202, the user must then input the custom recipe at 206 into the system. Otherwise the user merely selects a recipe from a display at 204 from a list of existing recipes. The system will receive and confirm the selection of recipe at 208.

Next, the user must determine if they would like a customized label at 210. If yes, the user will design and create the label at 212, either by interacting with the graphical user interface of their selected computing device or smart kiosk, or by inserting or uploading a previously-created label. Otherwise, the user can select a standard label at 214, which may be selected from a list of preexisting labels.

The user will need to determine if they would also like to purchase a charity batch at 216. As described above, this charity batch would be an exact copy of the product they are ordering, but would be delivered for free to a charity or recipient of the user's choice. If the user decides to create a charity batch at 216, the user selects the charity and inputs its relevant data at 218. Otherwise the system receives and confirms the selection at 220, a confirmation is generated and sent to the user at 222, such as via email, and the order is transferred to processing at 224. The processing step here may send the request out to a qualified household or third party, but the result is that the product is made according to the specifications as entered in the kiosk, and then the product is packaged and shipped at 226 and the process ends at 228 with the user receiving their ordered product.

Additionally, users can create sharable recipe libraries and videos about their personalized and/or custom food-making for other users to watch and learn from.

The order is transmitted to the processing facility, which may be local to the ordering station (e.g. at the kiosk) or remote from the user. The processing facility could automatically generate the product from the recipe using machinery. Once the product is prepared, it is packaged and labeled and the selected quantities are sent to the user and to all other recipients selected by the user.

For orders transmitted, the user will build the product recipe from several category lists which includes ingredients or base components of the final product. This again would be done using a computerized interface as described above. After the product is designed by the user using the computerized interface, the steps continue as outlined above. This alternative embodiment provides a more simplified approach to providing a finished food product. Alternatively, for self-produced orders by qualified households, orders are made in accordance with documented recipe procedures as established within the system and as processed by the processing entity.

III. Alternative Embodiment Futures-Based Product Delivery System 302

Figure 6:
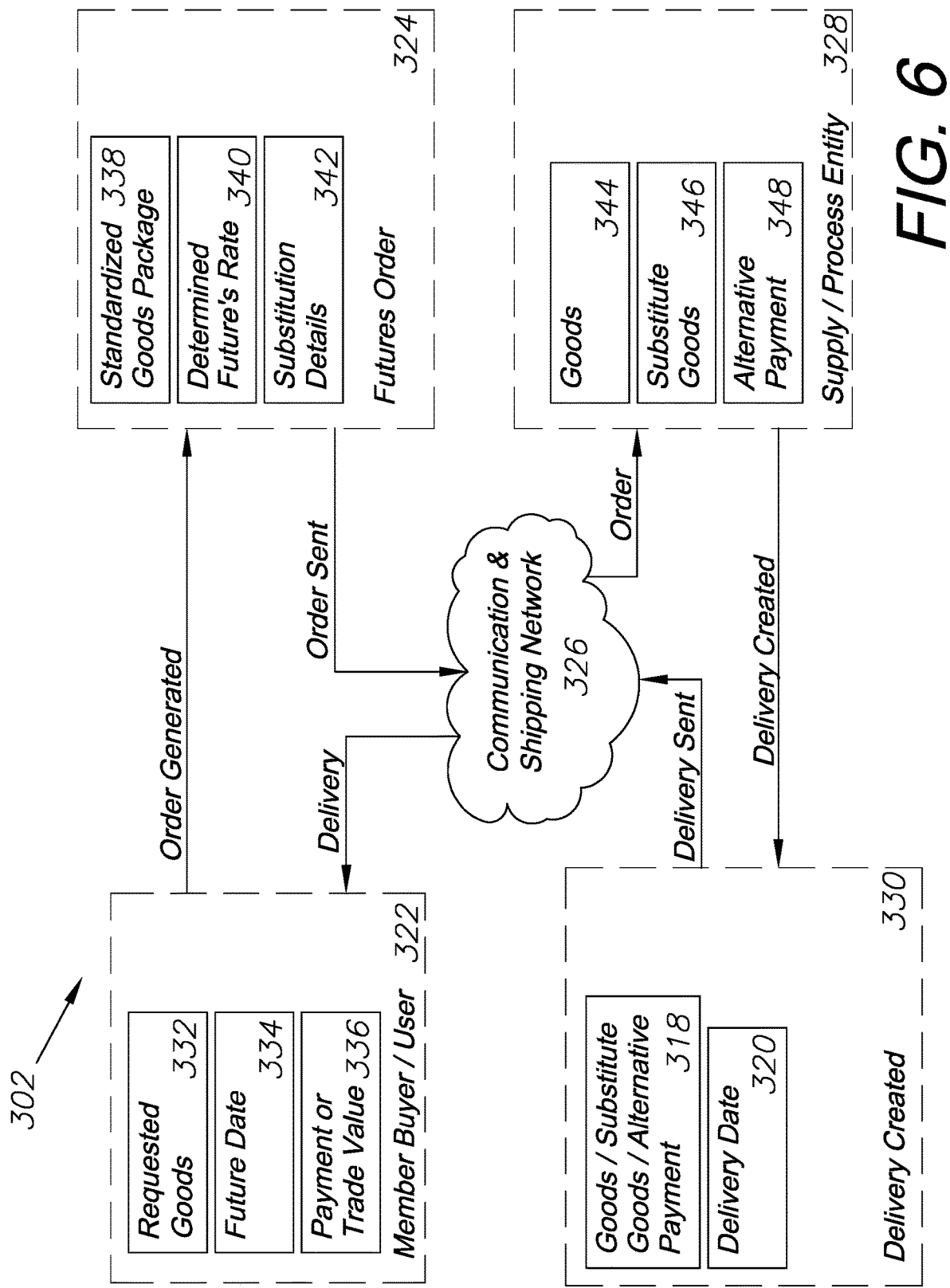
FIG. 6 is a diagrammatic representation of an alternative embodiment food delivery system and method.

FIG. 6 shows an alternative embodiment futures-based product delivery system 302 which may incorporate elements of the previous embodiment, such as delivery and ordering at kiosks or any of the other features taught above. Here, the member buyer/user 322 requests goods 332 at a date sometime in the future (future date 334) at a predetermined value 336, which can be for currency, trade, or some alternative payment. This follows the traditional futures-type trading market, except that here the user may indicate that they will need a package of produce or a processed derivative of such produce, such as carrots or shelf stable canned carrots, at some time in the future, such as one year. This request is delivered to the supply/process entity 328 who prepares the goods for delivery to the user. This is done through the communication and shipping network 326, such as the network escribed in the previous embodiment, or through any standard communication and shipping network that may be available. It should be noted that the supply/process entity 328 can also initiate the future request for goods 332, by initiating an offer of goods at a future date 334. The buyer in that circumstance would then accept the offer and pay the cost.

The order is generated by the user as shown, with the futures order 324 including standardized goods package 338 (e.g. such as a 24-pack of goods), the determined future's rate 340 paid, and any substitution details 342. The substitution details allow the supply entity 328 to deliver substitute goods in place of the ordered goods if the ordered goods are unavailable. For example, if the user orders a crate of one type of vegetable, but indicates that other types are allowed as substitute in the substitute details 342 of the futures order 324 at the rate paid, those substitute goods can be provided in the absence of the ordered goods.

The order goes to the supply/process entity 328. This entity has goods 344, substitute goods 346, and alternative payment 348 available for responding to the order. Once the future date arrives, the supply/process entity 328 creates the delivery 330. This delivery includes the goods, substitute goods, or alternative payment 318 as well as a delivery date 320. For example, the delivery can include the goods as ordered, substitute goods as agreed upon in the futures order, or a cash or alternative payment if no goods are available at that time. The rates are all based upon the original order and agreed upon prices. The delivery is then sent to the ember buyer/user 322 through whatever channels are agreed upon.

Figure 7:
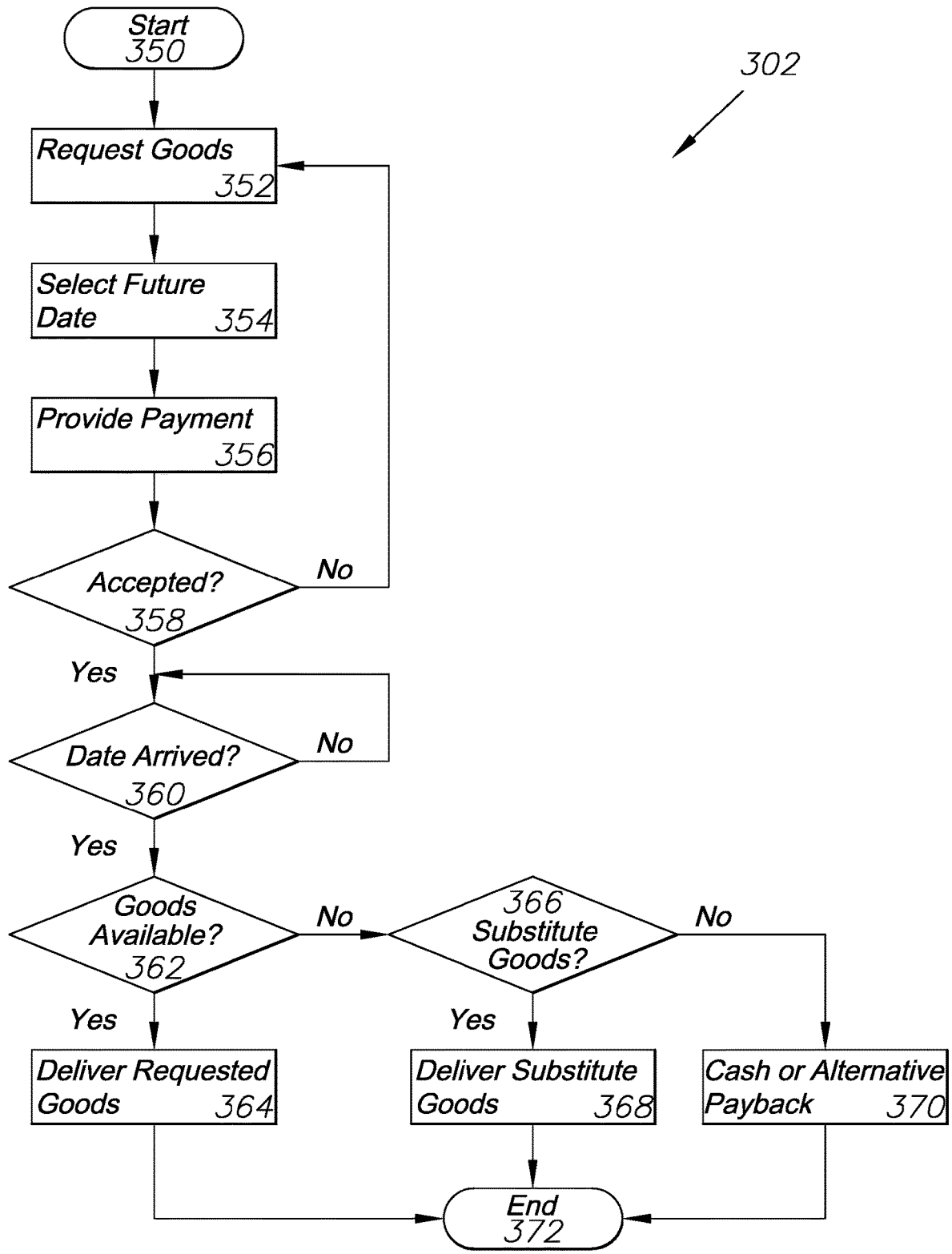
FIG. 7 is flowchart diagramming steps taken in practicing the embodiment thereof.

FIG. 7 shows a flow chart which diagrams these steps of the futures-based product delivery system 302. The process begins at 350. The goods are requested at 352 by the member buyer/user 322. The date is selected 354 when the delivery is desired. Payment is made at 356 at a rate determined by the user and agreed upon by the supply entity 328 or by some unrelated third party. If the request is accepted at 358, the process continues. If the request is not accepted at 358, the user will have to find another supplier to meet the request.

Once the request is accepted at 358, the process waits until the date arrives at 360. If the goods are available at 362, those goods are delivered at 364 and the process ends at 372. If the goods are not available at 362, but agreed upon substitute goods are available at 366, those substitute goods are delivered at 368 and the process ends at 372. Otherwise cash or alternative payback is delivered to the user at 370, and the process ends at 372.

As above, this process may be initiated by the supply/process entity 328. The flow chart of FIG. 7 at the request goods step at 352 would simply require the supply/process entity 328 to offer the goods in the future at the future date, and request payment from a buyer who would then provide the payment at 356.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method of requesting, generating, and delivering a customized food order, the method comprising the steps:

submitting to a remote server, from a third-party, a request to be approved as a third-party fulfilment entity, said request including a submission, and said remote server comprising a processor, data storage, and connection to said wireless communications network, said data storage storing a database;

approving said third-party as said third-party fulfillment entity with said processor of said remote server based upon said submission;

providing a stationary computing device comprising a securable stationary kiosk, said computing device comprising a processor, data storage, graphical user interface (GUI), and connection to wireless communications network;

generating a request with said stationary computing device by a requesting party, said request comprising a recipe for a first food product and an educational video for teaching said recipe;

wherein said requesting party is in possession of a second food product;

providing a securable storage compartment as a component of said securable stationary kiosk;

placing said second food product into said securable storage compartment of said securable stationary kiosk;

retrieving and shipping said second food product to an end point;

said request comprising a duplicate first food product order concurrent with the first food product intended for the requesting party to be delivered to a gift recipient;

sending said request to said remote server;

processing said request at said remote server;

storing said recipe into said database;

authorizing said third-party fulfillment entity with said remote server processor;

delivering said request to said third-party fulfillment entity;

determining whether substitute goods are required;

authorizing the use of substitute goods as required;

preparing said first food product and said duplicate food product at said third-party fulfillment entity based upon said recipe;

preparing said educational video at said third-party after receiving said request;

delivering said first food product and said educational video to said securable stationary kiosk;

confirming identity of a recipient;

granting access to said securable storage compartment;

thereby trading a quantity of said first food product for a quantity of said second food product; and delivering said duplicate first food product to said gift recipient, thereby fulfilling said request.

2. The method of claim 1, wherein said method is associated with community-based farms.

3. The method of claim 1, wherein said method is associated with a cooperative farming association.

4. The method of claim 1, wherein said first and second food products are produced in vertically growing arrangements.

* * * * *